(12) United States Patent
Lee (10) Patent No.: US 6,219,447 B1
(45) Date of Patent: Apr. 17, 2001

(54) METHOD AND CIRCUIT FOR EXTRACTING HISTOGRAM AND CUMULATIVE DISTRIBUTION FUNCTION FOR IMAGE ENHANCEMENT APPARATUS

(75) Inventor: Hyo-seung Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/026,611

(22) Filed: Feb. 20, 1998

(30) Foreign Application Priority Data

Feb. 21, 1997 (KR) .................................................... 97-5253

(51) Int. Cl.[7] ...................................................... G06K 9/00
(52) U.S. Cl. .......................... 382/168; 348/672; 358/522
(58) Field of Search ............................ 348/672; 358/522, 358/455, 460; 382/168, 169, 254, 271

(56) References Cited

U.S. PATENT DOCUMENTS 4,445,138 * 4/1984 Zwirn et al. ......................... 348/672
5,081,693 * 1/1992 Gannon ................................ 382/312
5,294,986 * 3/1994 Tsuji et al. ........................... 348/672

* cited by examiner

Primary Examiner—Yon J. Couso
(74) Attorney, Agent, or Firm—Sughrue, Mion, Zinn, Macpeak & Seas, PLLC

(57) ABSTRACT

A method for extracting a histogram and a cumulative distribution function (CDF) value for an image enhancement apparatus, and a circuit therefor are provided. The histogram extraction is performed during an active section of a video signal. The level of an input digital video signal is input as an address of a memory, and a data value stored at the address is increased. The processes are repeated during a one-screen period, thereby obtaining a histogram value indicating the number of samples distributed to each gray level. Also, a CDF value of each gray level is obtained by cumulatively integrating the number of samples from the lowest gray level on the basis of the histogram value obtained, during a vertical blanking period of the video signal. Therefore, the histogram/CDF extracting circuit can be built of simple hardware and an integrated structure, even though it performs both histogram and CDF extractions.

9 Claims, 5 Drawing Sheets

METHOD AND CIRCUIT FOR EXTRACTING HISTOGRAM AND CUMULATIVE DISTRIBUTION FUNCTION FOR IMAGE ENHANCEMENT APPARATUS

BACKGROUND OF THE INVENTION

1. Field of the Invention

The present invention relates to a method and circuit for extracting a histogram and a cumulative distribution function (CDF) for an image enhancement apparatus. More particularly, the present invention relates to a simple extraction circuit having an integrated structure, which controls the extraction periods for a histogram and a CDF using a memory, and a method therefor.

2. Description of Related Art

Histogram equalization involves converting a given input image on the basis of the histogram of the input image. Here, the histogram is a distribution of gray levels in a given input image. The histogram of the gray levels provides an entire representation of the appearance of an image. Appropriately adjusting the gray levels according to the sample distribution of an image enhances the appearance or the contrast of the image.

Histogram equalization, as a method for enhancing the contrast of a given image according to a sample distribution of the image, has been the most widely known among many methods for contrast enhancement, and is disclosed in the following documents: [1] J. S. Lim, "Two-Dimensional Signal and Image Processing", Prentice Hall, Eaglewood Cliffs, N.J. 1990; and [2] Reading, Mass. 1977.

Such a technique using the histogram of a given image has been usefully applied to various fields such as medical image processing, infrared image processing, radar image processing, etc.

Figure 1:
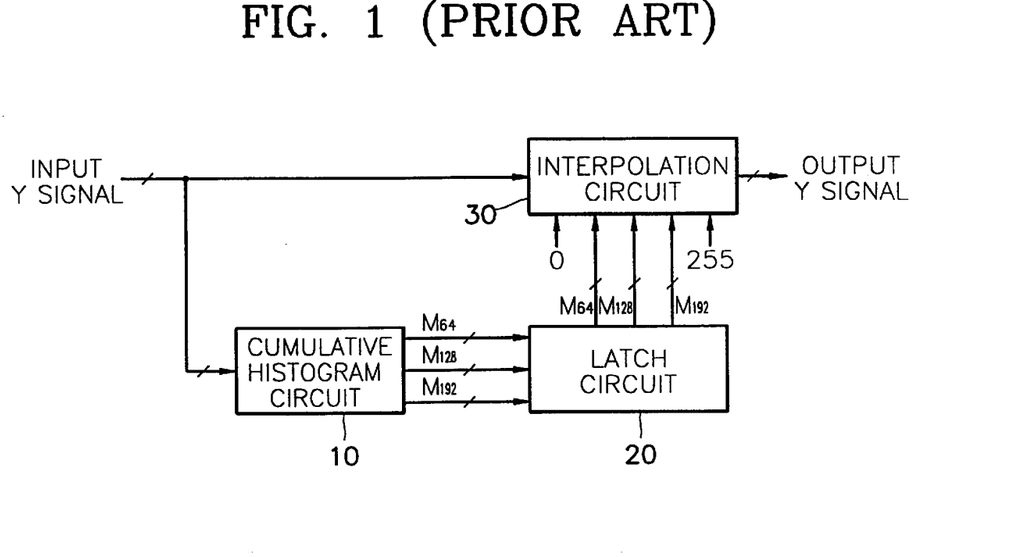
FIG. 1 is a block diagram of a conventional image enhancement apparatus.

Meanwhile, a conventional image enhancement apparatus adopting a histogram equalizer to improve the contrast of an image is shown in FIG. 1. Since the conventional image enhancement apparatus has been disclosed in U.S. Pat. No. 5,388,168 issued to Hirohiko Sakashita. et al, on Feb. 7, 1995, it will be described only briefly here.

Referring to FIG. 1, a cumulative histogram circuit 10 receives a digital input luminance signal Y and obtains cumulative histograms $M_{64}$, $M_{128}$ and $M_{192}$. A latch circuit 20 temporarily stores the histograms $M_{64}$, $M_{128}$ and $M_{192}$ obtained by the cumulative histogram circuit 10. The obtained histograms are kept until the cumulative histogram circuit 10 obtains the subsequent histograms and outputs the result thereof. An interpolation circuit 30 interpolates a new input luminance signal Y in real time, on the basis of the cumulative histograms $M_{64}$, $M_{128}$ and $M_{192}$ previously obtained by the cumulative histogram circuit 10, to correct the new input luminance signal, and then outputs the resultant signal.

Figure 2:
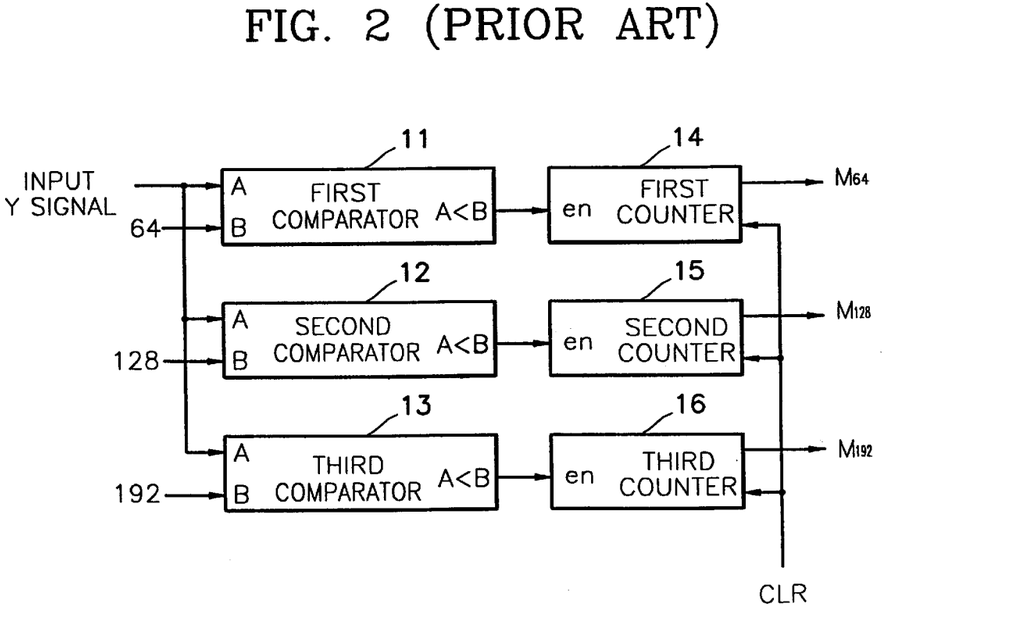
FIG. 2 is a block diagram of the cumulative histogram circuit shown in FIG. 1.

FIG. 2 is a block diagram of the cumulative histogram circuit 10 shown in FIG. 1. Referring to FIG. 2, the conventional cumulative histogram circuit 10 has an integrated structure where histogram and cumulative distribution function (CDF) are extracted together. That is, the conventional cumulative histogram circuit 10 includes comparators 11, 12 and 13 for comparing the input luminance signal Y with reference levels 64, 128 and 192, and counters 14 to 16 which count according to the outputs of the comparators 11, 12 and 13, respectively, and are reset by a clear signal CLR.

The first comparator 11 compares the input luminance signal Y with the first reference level 64, and the first counter 14 is incremented when the input luminance signal value is less than the first reference level 64. The second comparator 12 compares the input luminance signal Y with the second reference level 128, and the second counter 15 is incremented when the input luminance signal value is less than the second reference level 128. The third comparator 13 compares the input luminance signal Y with the third reference level 192, and the third counter 16 is incremented when the input luminance signal value is less than the third reference level 192. Assuming that the value of the input luminance signal Y is 100, the second and third comparators 12 and 13 each output logic high. Thus, the second and third counters 15 and 16 each increase their count values by one. Supposing that the value of the input luminance signal Y is 32, the first to third comparators 11 to 13 all output logic high, and the first to third counters 14 to 16 all increase their count values by one. The distribution of gray levels of an input image is extracted through the above process.

For convenience of explanation, the cumulative histogram circuit 10 shown in FIG. 2 has an 8-bit input digital encoded luminance signal having a value ranging from 0 to 255, and requires only three counters and comparators by setting three comparative levels of 64, 128 and 192. However, in practice, the cumulative histogram circuit 10 must have more comparative levels. For example, if the number of comparative levels is set to be 32, e.g., 8, 16, 24, 32, 40, . . . , 240 and 248, then the numbers of comparators and counters must also be increased to 32. Therefore, the size of the required hardware increases. Also, since the input luminance signal is input concurrently to the plurality of comparators whose number corresponds to the number of comparative levels, problems such as a fan-in phenomenon may occur. Furthermore, when the input luminance signal has a very small value, all of the comparators are enabled so that the counters and all of the comparators operate simultaneously. As a result, power consumption is increased due to the many counting operations. Further, the number of comparators and counters which operate depending on the level of the input luminance signal are limited, thereby making power consumption irregular.

SUMMARY OF THE INVENTION

To solve the above problem, it is an object of the present invention to provide a method for extracting a histogram and a cumulative distribution function (CDF) by controlling the extraction periods for the histogram and CDF using a memory.

It is another object of the present invention to provide a circuit for extracting a histogram and a CDF which has an integrated structure and is constituted of simple hardware, by extracting the histogram and the CDF in different periods using a memory.

To accomplish the first object, there is provided a histogram/CDF extracting method for enhancing the quality of an image by histogram-equalizing an image signal expressed according to a predetermined number of gray levels. The method comprises the steps of inputting an input digital image signal as an address; increasing the value of data stored at the input address; obtaining a histogram indicating the number of samples distributed to each gray level by repeating the address input step and the data value increasing step for a first predetermined period of time; and obtaining a cumulative distribution function (CDF) value of each gray level by cumulatively integrating the numbers of samples from the lowest gray level for a second predetermined period of time on the basis of the obtained histogram value.

To accomplish the second object, there is provided a histogram/CDF extracting circuit in an image enhancement apparatus including a histogram/CDF extracting circuit for extracting a histogram indicating the number of samples distributed to each gray level of an input digital image signal and calculating a CDF value of each gray level on the basis of the extracted histogram, and a look-up table (LUT) for storing an enhanced signal obtained by multiplying a maximum gray level value by the CDF value of each input gray level extracted from the histogram/CDF extracting circuit, and reading out a corresponding enhanced signal according to the levels of the input image signal. The histogram/CDF extracting circuit comprises a first selector for selecting a digital image signal in a histogram extraction mode and selecting an incrementing address in a CDF extraction mode; a memory for receiving a signal selected by the first selector as an address, and writing a histogram value increased by "1" to the address, in the histogram extraction mode, and a current input CDF value thereto in the CDF extraction mode; a first buffer for temporarily storing a histogram value read from the memory in the CDF extraction mode; a second selector for selecting a histogram value stored in the memory, in the histogram extraction mode, and selecting a histogram value temporarily stored in the first buffer, in the CDF extraction mode; a second buffer for temporarily storing a CDF value read from the memory and then outputting the temporarily-stored CDF value as a previous CDF value in the CDF extraction mode; a third selector for selecting a predetermined value "1", in the histogram extraction mode, and selecting the previous CDF value stored in the second buffer, in the CDF extraction mode; an adder for adding the histogram value, stored in the memory and selected by the second selector, to the value "1" selected by the third selector, and applying the result of the addition back to the memory, in the histogram extraction mode, and for adding the histogram value, stored in the first buffer and selected by the second selector, to the previous. CDF value, stored in the second buffer and selected by the third selector, and applying the result of addition back to the memory as the current CDF value, in the CDF extraction mode; and a generator for applying a selection control signal depending on the histogram and CDF extraction modes to the first to third selectors in response to the horizontal and vertical synchronous signals of the image signal, sequentially increasing the incrementing address corresponding to a predetermined number of gray levels to thus output the result to the memory in the CDF extraction mode, and generating an operation control signal for operating the memory and the first and second buffers, wherein a CDF value of each gray level is output from the memory.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 3:
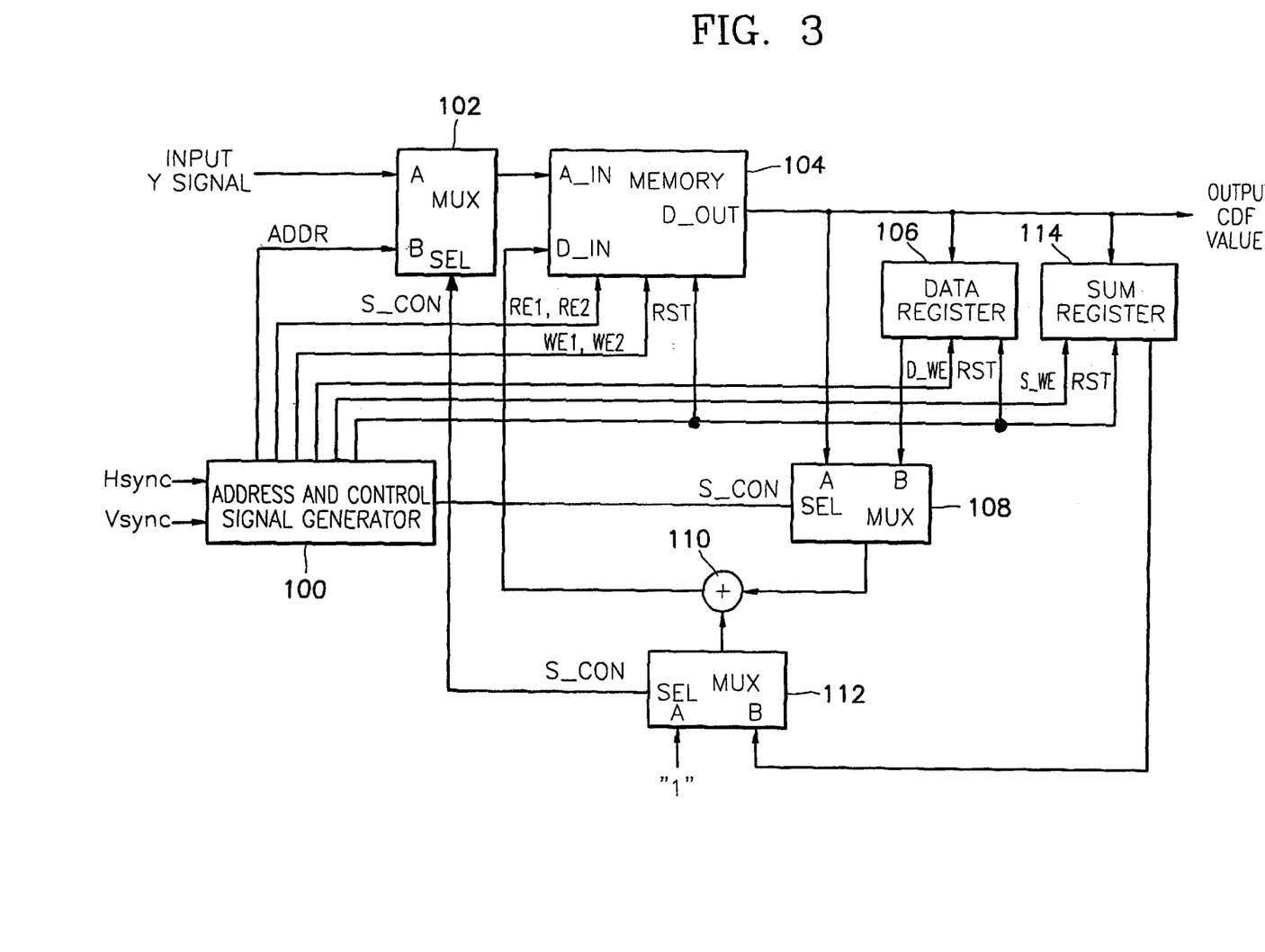
FIG. 3 is a circuit diagram of an embodiment of a histogram/CDF extracting circuit according to the present invention.

Referring to FIG. 3, a first input port A of a multiplexer MUX 102 receives a digital encoded luminance signal Y, a second input port B thereof receives an address ADDR from an address and control signal generator (abbreviated to "generator") 100, a selection port SEL thereof receives a selection control signal S_CON from the generator 100, and an output port thereof is connected to an address input port A_IN of a memory 104. At this time, horizontal and vertical synchronous signals $H_{SYNC}$ and $V_{SYNC}$ of a video signal detected by a synchronous signal detector (not shown) are applied to the generator 100. A data input port D_IN of the memory 104 is connected to the output port of an adder 110. The memory 104 receives first and second write enable signals WE1 and WE2 for histogram/CDF extraction, first and second read enable signals RE1 and RE2 for histogram/CDF extraction, and a reset signal RST, all from the generator 100. A data output port D_OUT of the memory 104 outputs a CDF value, and is commonly connected to an input port of a data register 106, a first input port A of a MUX 108, and an input port of a sum register 114. The data register 106 receives a write enable signal D_WE and a reset signal RST from the generator 100. An output port thereof is connected to a second input port B of the MUX 108. A selection port SEL of the MUX 108 receives the selection control signal S_CON from the generator 100, and an output port thereof is connected to an input port of the adder 110. A first input port A of a MUX 112 receives a predetermined value "1", a selection port SEL thereof receives the selection control signal S_CON from the generator 100, and an output port thereof is connected to another input port of the adder 110. The sum register 114 receives a write enable signal S_WE and a reset signal RST from the generator 100, and an output port thereof is connected to a second input port B of the MUX 112.

Now, the operation of the circuit shown in FIG. 3 for histogram extraction and for CDF extraction will be separately described.

I. Histogram Extraction

First, a video signal includes an active period and a blanking period, and the blanking period is again divided into horizontal and vertical blanking periods. The histogram extraction is made in the active period of a video signal. Accordingly, the generator 100 receiving the horizontal and vertical synchronous signals $H_{SYNC}$ and $V_{SYNC}$ applies the selection control signal S_CON indicating a histogram extraction mode, during the active period of a video signal, to the MUXes 102, 108 and 112, and then each of the MUXes 102, 108 and 112 selects a signal applied via the first input port A.

Figure 4A:
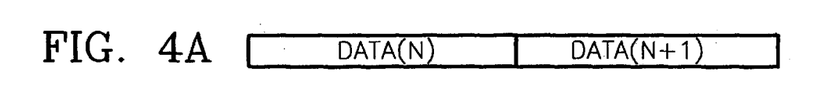
FIGS. 4A through 4D are timing views showing the operation of the circuit shown in FIG. 3 upon histogram extraction.
Figure 4B:
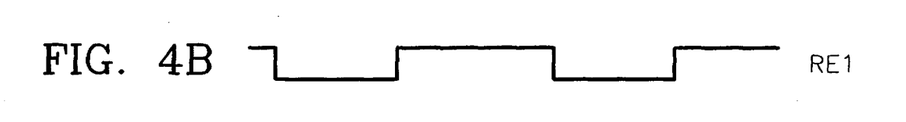
Figure 4C:
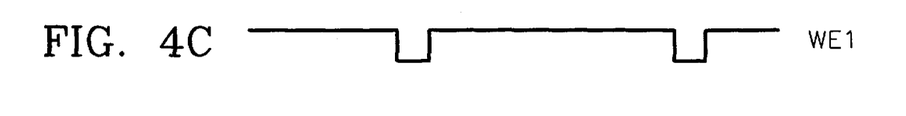
Figure 4D:
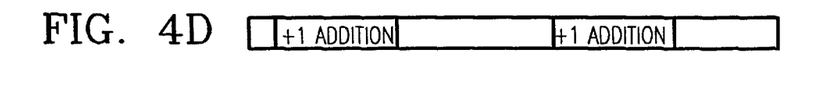

That is, an input luminance signal is applied to the address port A_IN of the memory 104 via the first input port A of the MUX 102. Here, DATA(N) and DATA(N+1) shown in FIG. 4A represent arbitrary Nth and (N+1)th data input during the active period of a video signal. Data stored in a current address corresponding to a current input luminance signal is read from the memory 104, according to the first read enable signal RE1 having logic "low" active period shown in FIG. 4B. The MUX 108 selects the data that is read from the memory 104 and received via the first input port A, and applies the selected data to the adder 110. The MUX 112 selects "1" input via its first input port A and applies the selected value "1" to the adder 110. The adder 110 adds the data value that is read from the memory 104 and selected by the MUX 108 to the value "1" selected by the MUX 112, and applies the result to the data input port D_IN of the memory 104. At this time, the memory 104 writes the result of the adder 110 to a current address corresponding to the input luminance signal during the logic "low" active period of the first write enable signal WE1 shown in FIG. 4C, and consequently, the data stored in the current address is increased by "1". Such a method is repeated over the input luminance image of one screen, thereby performing the histogram extraction. A value "+1" is added to a value read from the current address corresponding to the input luminance signal value, during the "low" active period of the read enable signal RE1, as shown in FIG. 4D.

Meanwhile, if the input luminance signal is a 10 bit signal, the memory 104 has $2^{10}$ addresses. Each of the addresses stores a one-screen histogram, i.e., the number of samples distributed by gray levels between minimum and maximum gray levels 0 and $2^{10}-1$.

However, the size of the memory 104 can be reduced according to how many of the upper significant bits are selected from the input luminance signal output from the MUX 102, by a bit selector installed at the output of the MUX 102. For instance, when the input luminance signal is a 10 bit signal and the histogram is divided into 128 levels, the bit selector selects only the seven upper significant bits (corresponding to the 128 levels) and then applies the result as an address to the memory 104. Since the memory 104 has $2^7(=128)$ addresses, it can be recognized that the memory 104 is smaller than a memory having a full-scale address.

For example, if the current input luminance signal is 0011111111 (=255), data of the seven upper significant bits is 0011111(=31), and this value 31 is applied as the address of the memory 104. If the value of data stored in the address "31" of the memory 104 is 20, the data value 20 is read according to the first read enable signal RE1. The read value 20 is increased by "1" in the adder 110, and the resultant value 21 is again written to the address "31" of the memory 104.

Consequently, the number of samples corresponding to input luminance signal values from 0 to 7 is stored in the address "0" of the memory 104, and the number of samples corresponding to input luminance signal values from 8 to 15 is stored in the address "1" thereof, so that the number of samples corresponding to input luminance signals from 1016 to 1023 is stored in the address "127" thereof. Therefore, use of a bit selector at the input of the MUX 102 results in storage of a histogram of quantized gray levels in the memory 104.

II. CDF Extraction

Whereas the histogram is extracted in the active period of a video signal, the CDF is extracted in the vertical blanking period of the video signal. Accordingly, during the vertical blanking period of the video signal, the generator 100 receiving the horizontal and vertical synchronous signals $H_{SYNC}$ and $V_{SYNC}$ applies a selection control signal S_CON which represents a CDF extraction mode, to the MUXes 102, 108 and 112. Then, each of the MUXes 102, 108 and 112 selects a signal received via its second input port B.

That is, the MUX 102 selects the address ADDR received from the generator 100 and applies the selected address ADDR to the address input port A_IN of the memory 104. The generator 100 generates sequential incrementing addresses. That is, if the input luminance signal is of 10 bits and histogram is divided into $1024(=2^{10})$ levels, the generator 100 generates addresses sequentially increasing from 0 to 1023. If the histogram is divided into $128(=2^7)$ levels, the generator 100 generates sequentially increasing addresses from 0 to 127.

Figure 5A:
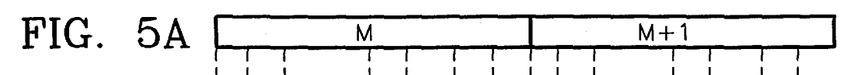
FIGS. 5A through 5F are timing views showing the operation of the circuit shown in FIG. 3 upon CDF extraction.
Figure 5B:
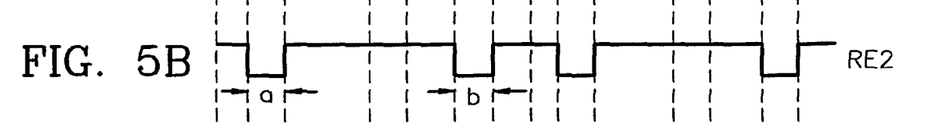
Figure 5C:
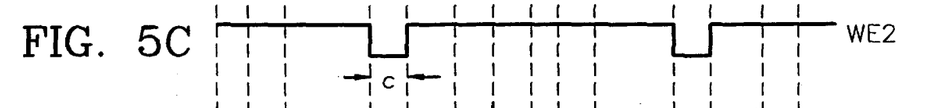
Figure 5D:
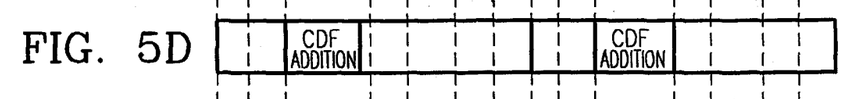
Figure 5E:
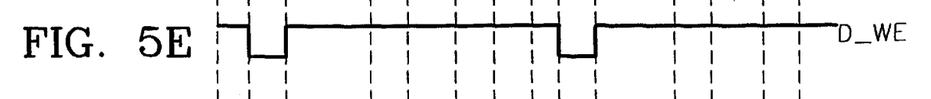

A histogram value stored in a predetermined address M shown in FIG. 5A is read from the memory 104 in a first logic "low" period "a" of the second read enable signal RE2 of FIG. 5B generated from the generator 100. The read histogram value is written to the data register 106 according to the write enable signal D_WE shown in FIG. 5E. The histogram value temporarily stored in the data register 106 is applied to the adder 110 via the second input port B of the MUX 108. The adder 110 adds the histogram value output from the MUX 108 to a gray level CDF value of a previous address M-1 that is stored in the sum register 114, received via the second input port B of the MUX 112. The result of the addition in the adder 110 is applied to the data input port D_IN of the memory 104. The memory 104 writes the output of the adder 110, i.e., a current gray level CDF value to the address M received via the MUX 102, according to the second write enable signal (WE2) shown in FIG. 5C. The CDF addition of the adder 110 is begun after a first "low" active period "a" of the second read enable signal RE2 of FIG. 5B, and ended before a first "low" active period "c" of the second write enable signal WE2 of FIG. 5C. This addition period is shown in FIG. 5D.

Figure 5F:
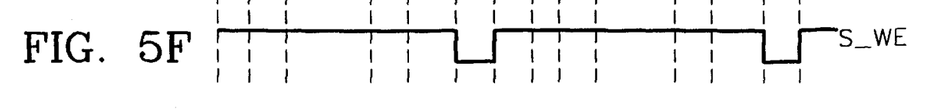

The gray level CDF value corresponding to a current address, as the result of the addition of the adder 110, written in the address M of the memory 104, is again read in a second "low" active period "b" of the second read enable signal RE2 shown in FIG. 5B. This time, the CDF value read from the memory 104 is written to the sum register 114 according to the write enable signal S_WE which is activated to logic "low" as shown in FIG. 5F. Also, the CDF value read from the memory 104 is simultaneously output externally, as the output CDF value. At this time, a value written in the sum register 114 is a gray level CDF value corresponding to the address M. After a current gray level CDF value has been written in the sum register 114, the generator 100 applies the next address M+1 to the second input port B of the MUX 102. Through repetition of such a process, a CDF value corresponding to each gray level is output, or a CDF value corresponding to each quantized gray level is output.

If an address value generated by the generator 100 is 10, a histogram value stored in an address "10" of the memory 104 is 100, and a value stored in the sum register 114 is 2000, then the value 100 stored in the address "10" of the memory 104 is applied to the data register 106, the result of the addition of the adder 110 is 2100, and the addition result 2100 is again applied to the memory 104 and written to the address "10" thereof. The value 2100 in the address "10" is read from the memory 104 and written in the sum register 114. If the data values of histograms corresponding to the addresses (0, 1, 2, 3, . . . ) of the memory 104 are 100, 50, 30, 200, . . . , then cumulative values 100, 150, 180, 380, . . . are obtained as CDF values. A current gray level CDF value is obtained by adding the histogram value of current level to the CDF value based on all the grey levels up to the immediately previous gray level.

Figure 7:
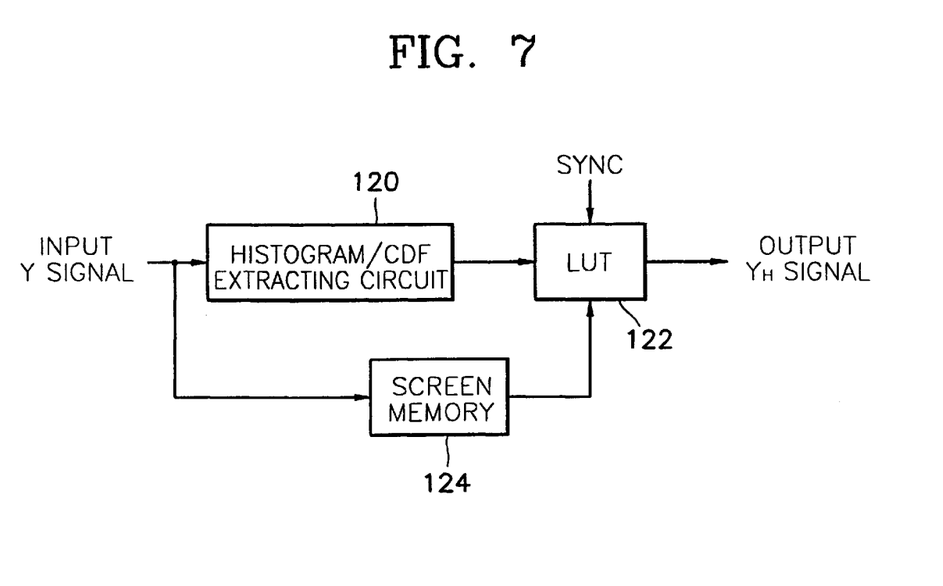
FIG. 7 is a block diagram of an image enhancement apparatus to which a histogram/CDF extracting circuit according to the present invention is applied.
Figure 8:
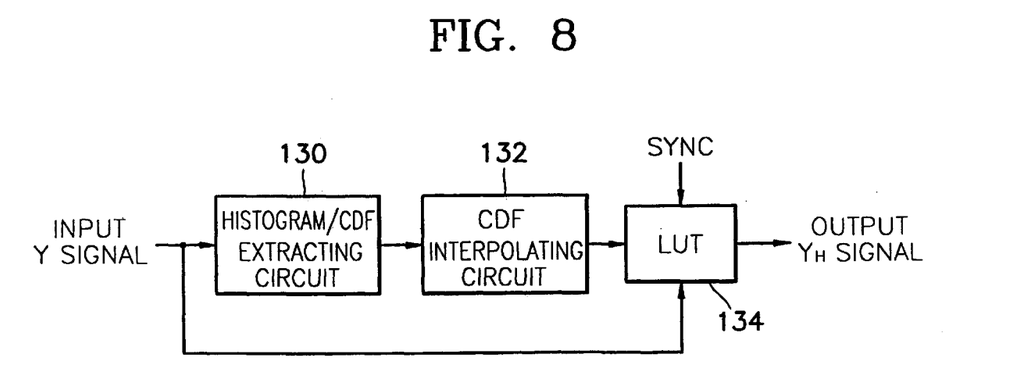
FIG. 8 is a block diagram of another image enhancement apparatus to which a histogram/CDF extracting circuit according to the present invention is applied.

After the CDF extraction is completed, the extracted CDF values are transmitted to a LUT, shown in FIGS. 7 and 8, for image enhancement processing. After the transmission is completed, the reset signal is applied to the memory 104, the data register 106 and the sum register 108 to reset them, in order to extract a histogram in the next active period of the video signal. Though the memory 104 was a dual port memory in the present invention for convenience of explanation, the dual port memory can be replaced by a single port RAM.

Figure 6A:
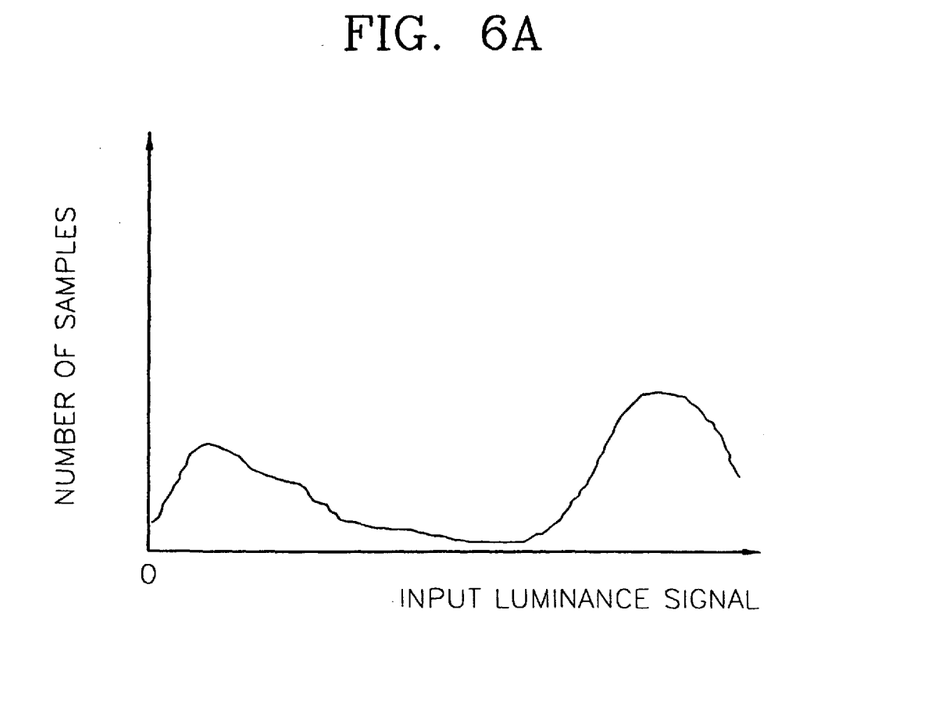
FIG. 6A is a graph showing the histogram of an input image to facilitate understanding of the present invention.
Figure 6B:
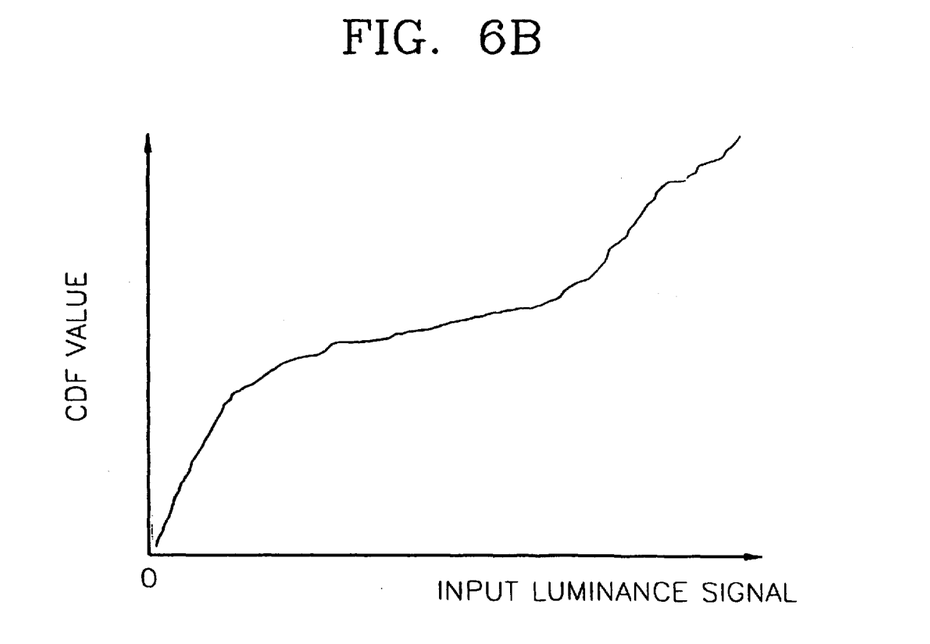
FIG. 6B is a graph showing a CDF curve with respect to the histogram characteristics shown in FIG. 6A.

FIG. 6A shows the characteristics of the histogram of an input image, and FIG. 6B shows a CDF curve obtained on the basis of the histogram shown in FIG. 6A, that is, a curve obtained by cumulatively integrating the histogram starting from the lowest gray level zero on the x axis.

FIG. 7 is a block diagram of an image enhancement apparatus to which the histogram/CDF extracting circuit shown in FIG. 3 is applied. Referring to FIG. 7, the image enhancement apparatus includes a histogram/CDF extracting circuit 120, a lookup table LUT 122 and a screen memory 124. The histogram/CDF extracting circuit 120 stores a histogram value from minimum to maximum gray levels upon extraction of a histogram under the configuration shown in FIG. 3, and the memory 104, which outputs a CDF value of each gray level, is utilized upon the extraction of a CDF. The LUT 122 stores a value obtained by multiplying a CDF value depending on each input gray level extracted by the histogram/CDF extracting circuit 120, by the maximum gray level value. That is, an enhanced signal $Y_H$, after an input luminance signal Y is histogram-equalized, is given as in the following Equation 1:

$$Y_H = \text{CDF value corresponding to } Y \times \text{maximum gray level} \quad (1)$$

At this time, a CDF value of a new screen is renewed by the LUT 122 according to a synchronous signal SYNC during the vertical blanking period. Here, if the screen is a frame, the synchronous signal SYNC is a frame synchronous signal, and if the screen is a field, the synchronous signal SYNC is a field synchronous signal.

Meanwhile, the screen memory 124 delays the input luminance signal by units of one screen, in order to perform a histogram equalization operation on data pertaining to a screen whose statistical properties (histogram and CDF) are obtained by the histogram/CDF extracting circuit 120. Here, the screen unit is a field or a frame.

Thus, the equalized output $Y_H$ corresponding to the input luminance signal Y can be obtained by selecting a value, stored in the LUT 122, corresponding to the input luminance signal.

FIG. 8 is a block diagram of another image enhancement apparatus to which the integrated histogram/CDF extracting circuit shown in FIG. 3 is applied. Referring to FIG. 8, the image enhancement apparatus includes a histogram/CDF extracting circuit 130, a CDF interpolation circuit 132 and a LUT 134. That is, the histogram/CDF extracting circuit 130 outputs a CDF value of a full-scale gray level when the memory 104 is applied to FIG. 7 under the configuration of FIG. 3. However, in FIG. 8, the histogram/CDF extracting circuit 130 outputs CDF values of quantized levels, i.e., a predetermined smaller number of levels than the full-scale gray level, in order to reduce the size of the memory 104. The CDF interpolation circuit 132 linearly interpolates the CDF values output from the histogram/CDF extracting circuit 130 using a predetermined algorithm and then outputs the interpolated CDF values. Here, a typical linear interpolation algorithm may be applied as the predetermined algorithm. The LUT 134 stores values obtained by multiplying each interpolated CDF value output from the CDF interpolation circuit 132 by a maximum gray level value. The CDF value of a new screen is renewed by the LUT 134 according to the synchronous signal SYNC during the vertical blanking period. Thus, the equalized output $Y_H$ corresponding to the input luminance signal Y can be obtained by selecting a value, stored in the LUT 134, which corresponds to the input luminance signal.

In FIG. 8, histogram equalization of a current screen is achieved by applying a CDF value obtained from the immediately previous screen with no change. This is possible without significant loss of quality, since the correlation between previous and current screens is 0.95 or more because of the characteristics of a moving image. Doing so avoids the need for a large capacity screen memory, greatly reducing the necessary hardware.

The present invention is applicable to a wide range of fields associated with the image quality enhancement of a video signal, i.e., broadcasting equipment, radar signal processing systems and medical technology, as well as home appliances such as camcorders, TVS, VCRs, etc.

As described above, in the circuit according to the present invention, histogram extraction is made in the active period of a video signal using a memory, and CDF extraction is performed in the vertical blanking period of the video signal. Thus, a single circuit can perform both the histogram extraction and the CDF extraction. Therefore, hardware size is reduced, and power consumption is lower and more regular.

What is claimed is:
1. A histogram and CDF extracting method for enhancing the quality of an image by histogram-equalizing an image signal expressed according to a predetermined number of gray levels, the method comprising the steps of:
 (a) applying only a predetermined number of upper significant bits of an input digital image signal as an address to access a data value stored in a memory at the address;
 (b) increasing by "1" the data value stored at the address;
 (c) determining a quantized histogram indicating a number of samples distributed to quantized gray levels fewer than a number of full-scale gray levels, by repeating the steps (a) and (b) for a first predetermined period of time;
 (d) determining quantized CDF values by adding the number of samples for a current quantized gray level to the cumulative number of samples of all previous quantized gray levels for a second predetermined period of time in accordance with the quantized histogram determined in step (c); and
 (e) linearly interpolating the quantized CDF values obtained in step (d) and outputting interpolated CDF values.

2. The histogram and CDF extracting method as claimed in claim 1, wherein steps (a) and (b) are performed during an active period of a video signal.

3. The histogram and CDF extracting method as claimed in claim 1, wherein the first predetermined period is one screen period.

4. The histogram and CDF extracting method as claimed in claim 1, wherein the second predetermined period is a vertical blanking period.

5. A histogram and cumulative distribution function (CDF) extracting circuit in an image enhancement apparatus for extracting a histogram indicating the number of samples distributed to quantized gray levels that are fewer than the number of full-scale gray levels of an input digital image signal and calculating a CDF value of each quantized gray level on the basis of the extracted histogram, a CDF interpolation circuit for linearly interpolating the CDF values extracted from the histogram/CDF extracting circuit and outputting interpolated CDF values, the circuit comprising:

a bit selector for selecting a predetermined number of upper significant bits of a digital image signal;

a first selector for receiving and selecting the predetermined number of the upper significant bits of the digital image signal selected by the bit selector, in a histogram extraction mode, and receiving and selecting an incrementing address, in a CDF extraction mode;

a memory for receiving from the first selector either the predetermined number of upper significant bits of the digital image signal or the incrementing address as an address signal designating a current address for accessing data, for writing a histogram value increased by "1" to the current address in the histogram extraction mode, and for writing a current input quantized CDF value to the current address in the CDF extraction mode;

a first buffer for receiving and temporarily storing a histogram value stored at the current address in the memory, in the CDF extraction mode;

a second selector for receiving and selecting the histogram value stored at the current address in the memory, in the histogram extraction mode, and receiving and selecting the histogram value temporarily stored in the first buffer, in the CDF extraction mode;

a second buffer for receiving and temporarily storing a quantized CDF value stored at a previous address in the memory and outputting the temporarily-stored CDF value as a previous quantized CDF value, in the CDF extraction mode;

a third selector for receiving and selecting a predetermined value "1", in the histogram extraction mode, and receiving and selecting the previous quantized CDF value stored in the second buffer, in the CDF extraction mode;

an adder for adding the histogram value, stored at the current address in the memory and selected by the second selector, to the value "1" selected by the third selector and providing the result of the addition back to the memory to be stored at the current address, in the histogram extraction mode, and for adding the histogram value, stored in the first buffer and selected by the second selector, to the previous quantized CDF value, stored in the second buffer and selected by the third selector, and applying the result of addition back to the memory as the current quantized CDF value to be stored at the current address, in the CDF extraction mode; and a generator for applying a selection control signal in accordance with the histogram and CDF extraction modes to the first, second and third selectors in response to the horizontal and vertical synchronous signals of the image signal, sequentially increasing the incrementing address corresponding to quantized gray levels and providing the result to the memory via the first selector in the CDF extraction mode, and generating an operation control signal for operating the memory and the first and second buffers, wherein a CDF value of each quantized gray level is output from the memory.

6. The histogram and CDF extracting circuit as claimed in claim 5, wherein the histogram extraction is performed during an active period of a one screen image signal.

7. The histogram and CDF extracting circuit as claimed in claim 5, wherein the CDF value extraction is performed during a vertical blanking period of a one screen image signal.

8. The histogram and CDF extracting circuit as claimed in claim 5, further comprising a screen memory for delaying the input image signal by units of a screen and applying the delayed image signal to a look-up table (LUT) for storing an enhanced signal obtained by multiplying a maximum gray level value by the interpolated CDF values and reading out a corresponding enhanced signal according to the levels of the input image signal the LUT.

9. The histogram and CDF extracting circuit as claimed in claim 5, wherein each of the first and second buffers comprises a register.

* * * * *